Figure 1:
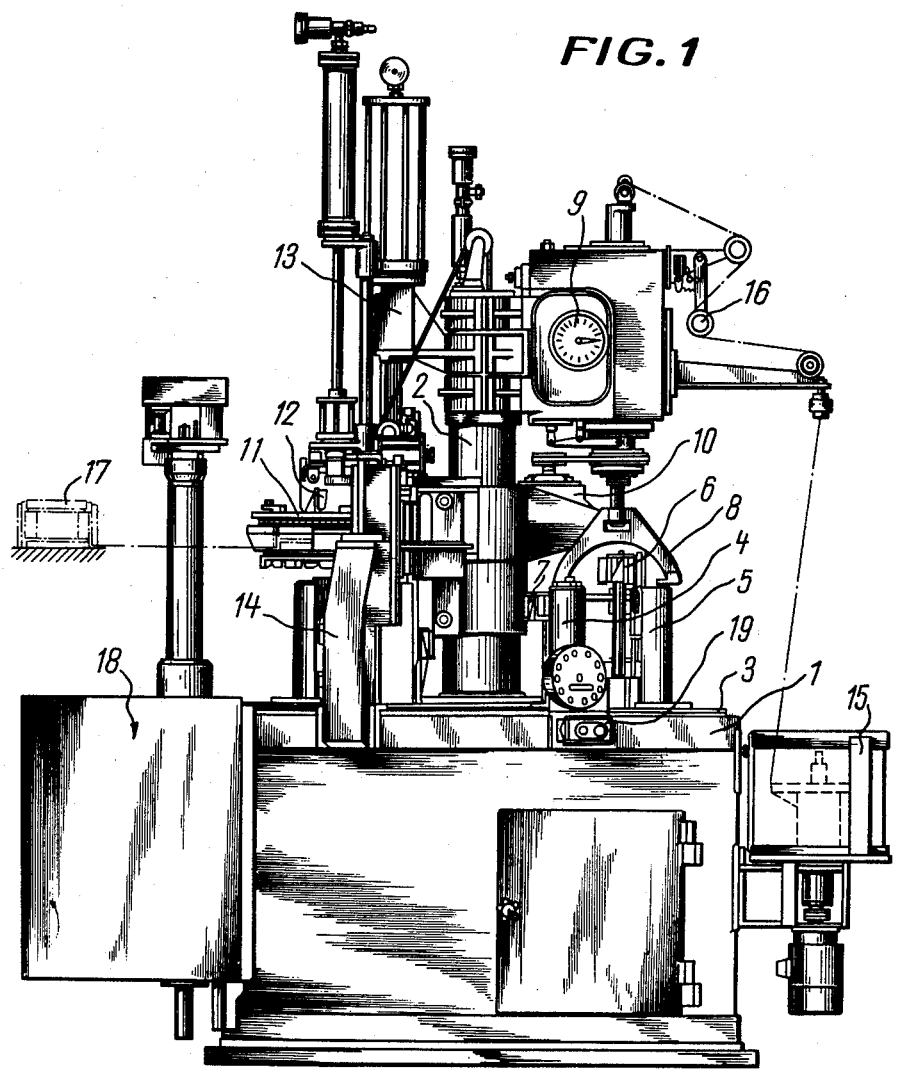

June 29, 1965    B. I. SHMOOLEVICH ETAL    3,191,638
MACHINE FOR FORMER WINDING OF ONE-AND MULTI-RANGE COILS
AND LAYING THEM INTO SEMI-CLOSED STATOR GROOVES
OF ELECTRICAL MACHINES
Filed April 3, 1962    9 Sheets-Sheet 5
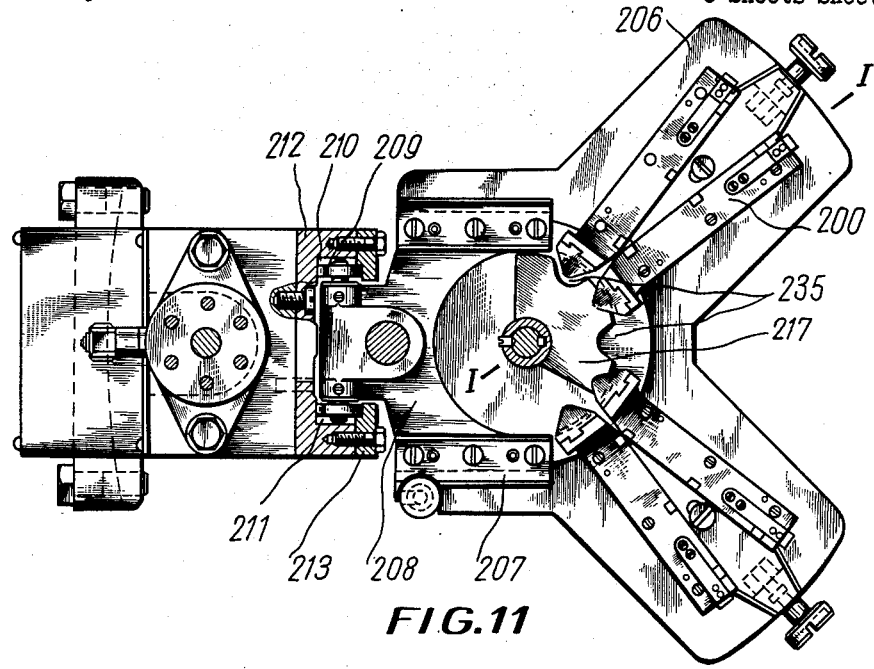
FIG.11
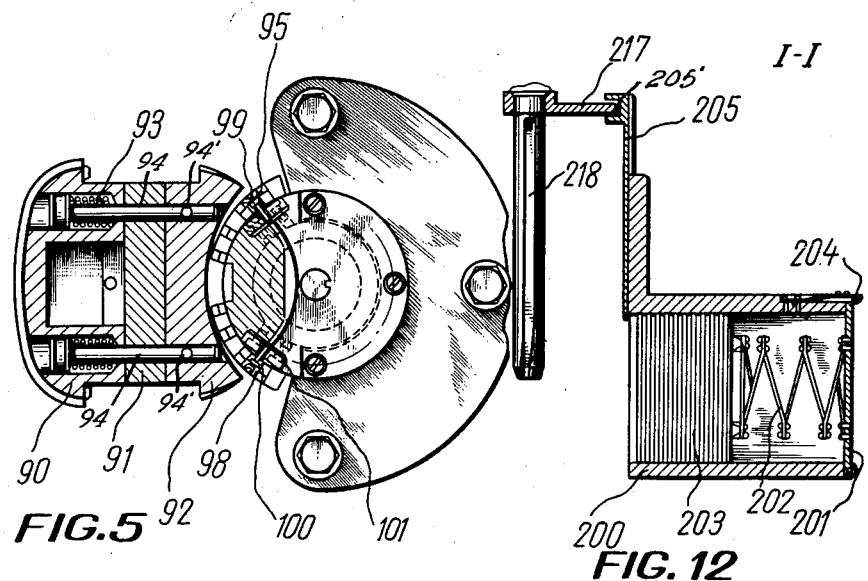
FIG.5
FIG.12

United States Patent Office 3,191,638
Patented June 29, 1965

3,191,638
MACHINE FOR FORMER WINDING OF ONE- AND MULTI-RANGE COILS AND LAYING THEM INTO SEMI-CLOSED STATOR GROOVES OF ELECTRICAL MACHINES
Bendersky Isaak Shmoolevich, 3 Miusskaya Str. 4b, Apt. 9; Klushnev Ievgueny Dmitrivich, Matrosskaya Tishina 16a, Apt. 3; Makeiev Arkady Sergeievich, Shcherbakovskaya Str. 40/42, Apt. 39; Ovchinnikova Hadezhda Petrovna, Lialin by-street 8a, Apt. 5; and Popov Konstantin Konstantinovich, Shcherbakovskaya Str. 40/42, Apt. 7, all of Moscow, U.S.S.R.
Filed Apr. 3, 1962, Ser. No. 184,854
13 Claims. (Cl. 140—92.1)

The present invention relates to a machine for the preformed winding of single and multiple coils and for inserting such coils into the stator grooves of electrical machines.

Some attempts have been made to design machines for direct insertion of coils into stator grooves of electrical machines without preliminary form winding.

Well known machines of this kind may be subdivided, in accordance with the manner of operation, into the following groups:

(1) A machine where winding is performed by means of a shuttle the trajectory of which reproduces, to a certain extent, the outlines of the coil inserted into the stator grooves.

(2) Machines where insertion of the winding is carried out as a result of simultaneous reciprocal movement of the shuttle and rocking movement of the stator pack. Here, with the reciprocal movement of the shuttle, conductors are laid into the grooves whereas, with the movement of the stator pack, the end portions of windings are formed.

(3) Machines where insertion of the winding wire into the stator grooves is effected by movement of the shuttle along a winding former fixed relative to the stator.

All of the above machines require complex movements of the working parts of the machine thereby materially complicating the design and construction of the machine which results in increasing the cost, decreasing the efficiency and adversely affecting the uniform quality of work output. In addition, in all machines where direct winding of turns is performed in the grooves of the stator pack the winding wire is subjected to considerable deformation as a result of which the wire stretches and reduces the diameter and the insulation is damaged.

As a result machines providing direct winding of turns in the stator grooves are relatively inefficient and are not generally used.

More practical are machines providing for separate winding and subsequent insertion of the coils into the stator grooves. In this case, the coil is wound by simple rotary motion of the winding former (or coiler) and inserted (axially or radially) into the stator grooves by relatively simple movements.

The main purpose of the present invention is to provide such a machine where both former winding and insertion of the coils into the semi-closed stator grooves is automatic which will ensure high efficiency of the machine and provide high efficiency line production of stators for electrical machines.

Other purposes of the present invention:
(1) To provide a machine where the following operations are automatic: a) delivery of stators to be fitted with coils onto the machine from the transporting device of the production line of manufacture of stators, b) fixing of the stators in working position in the machine and releasing and removing the stators with windings inserted therein from the machine.

(2) To provide a machine ensuring mechanized closing of the stator grooves with cardboard covers immediately after insertion of the coils into the grooves to prevent inadvertent displacement of the coils in the stator grooves.

(3) To provide a machine ensuring proper former winding.

(4) To provide a compact machine convenient for attendance by an operator.

(5) To provide a machine eliminating entangling of wires connecting a coil inserted into the stator with a coil to be subsequently inserted.

(6) To provide a machine ensuring winding and insertion of coils into the stator grooves with different groove pitches without requiring any readjusting of the machine.

(7) To provide a machine ensuring preliminary forming of the leads of the coils inserted into the stator by pressing from the center of the stator toward the periphery.

Figure 2:
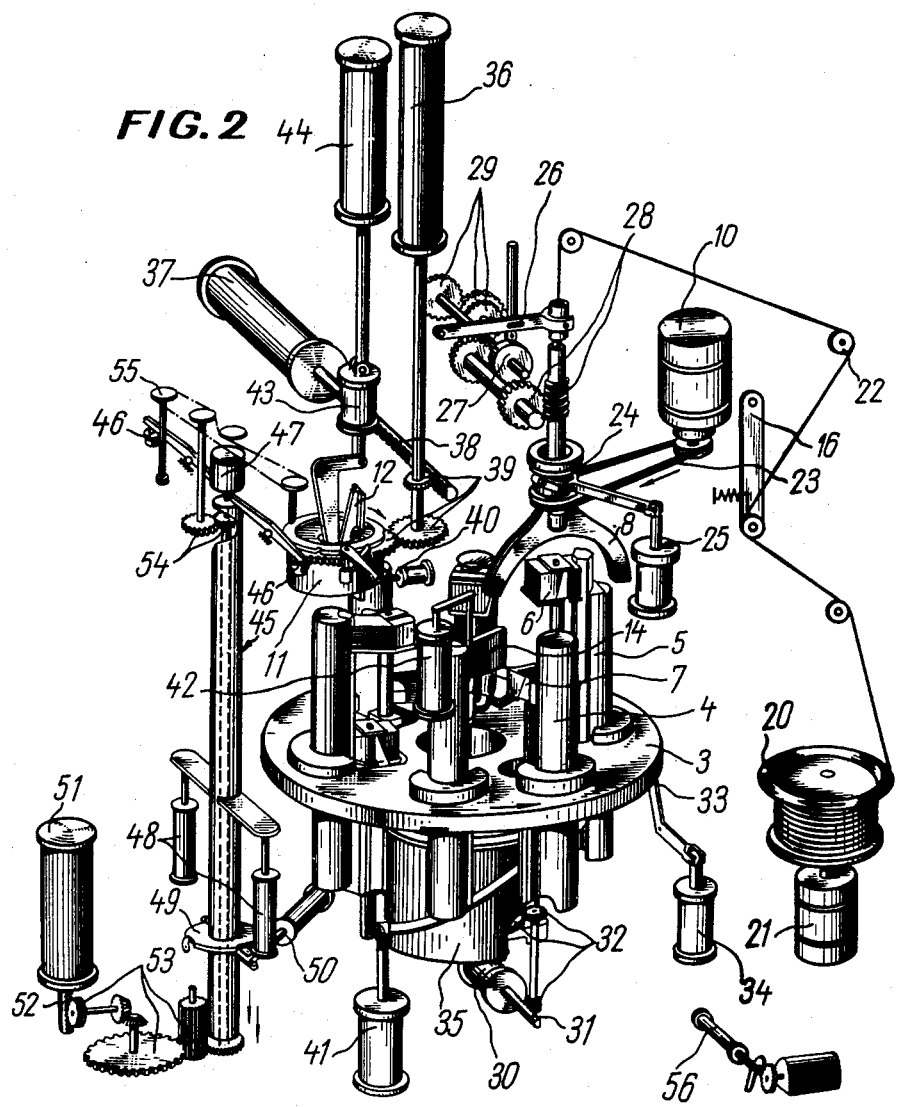
Figure 3:
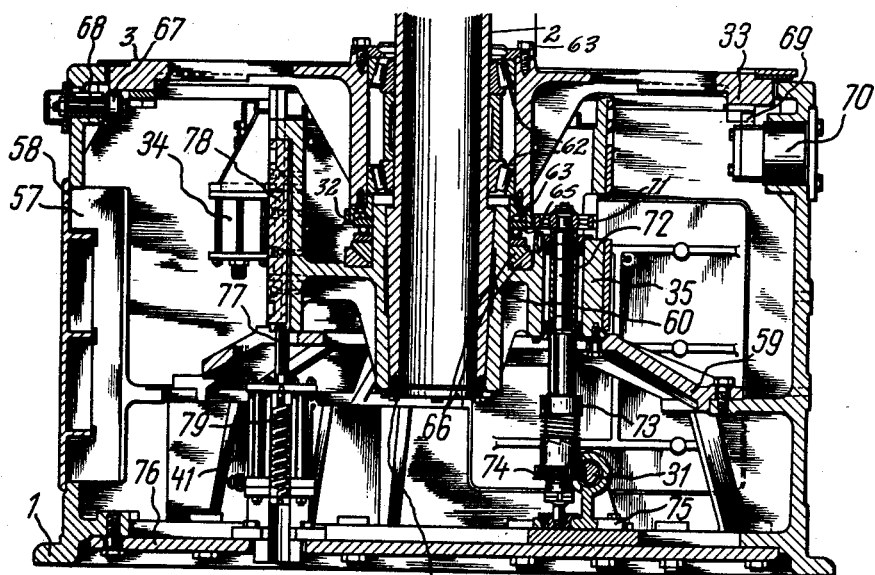
Figure 7:
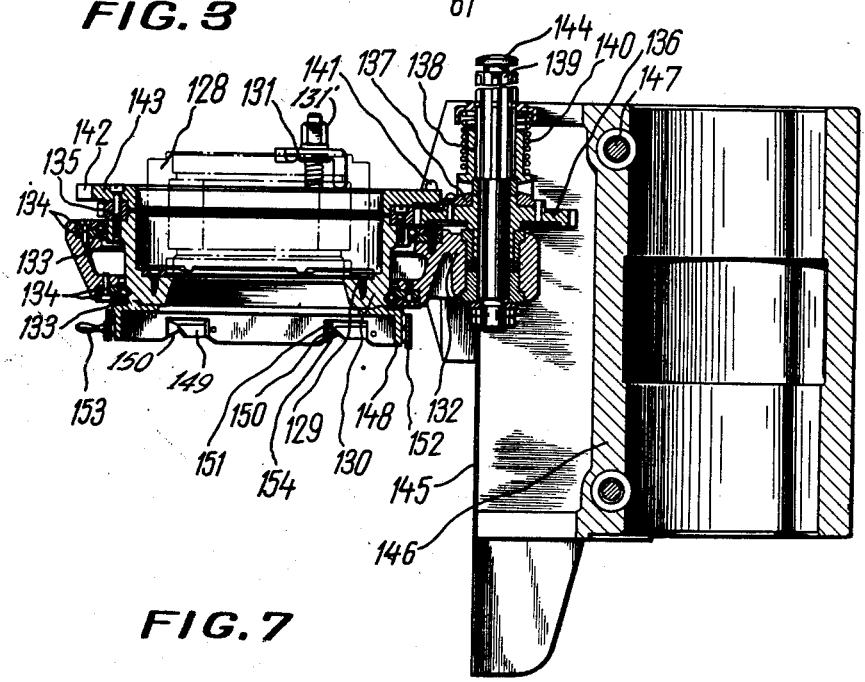
Figure 4:
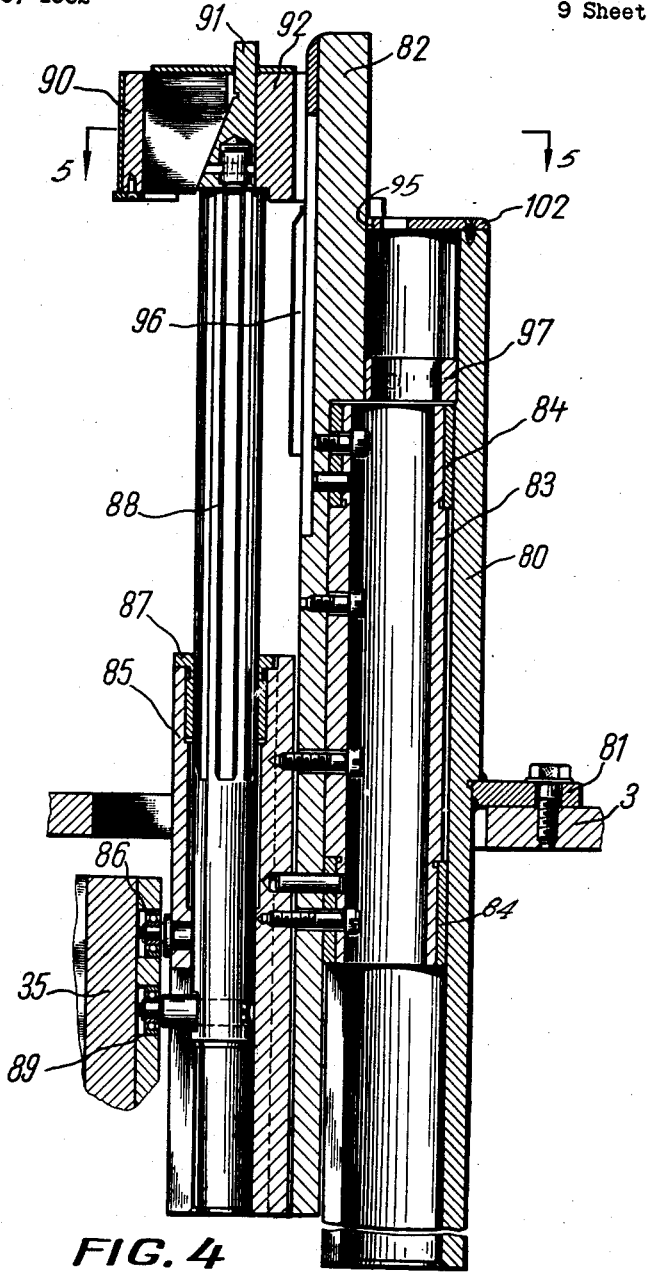
Figure 6:
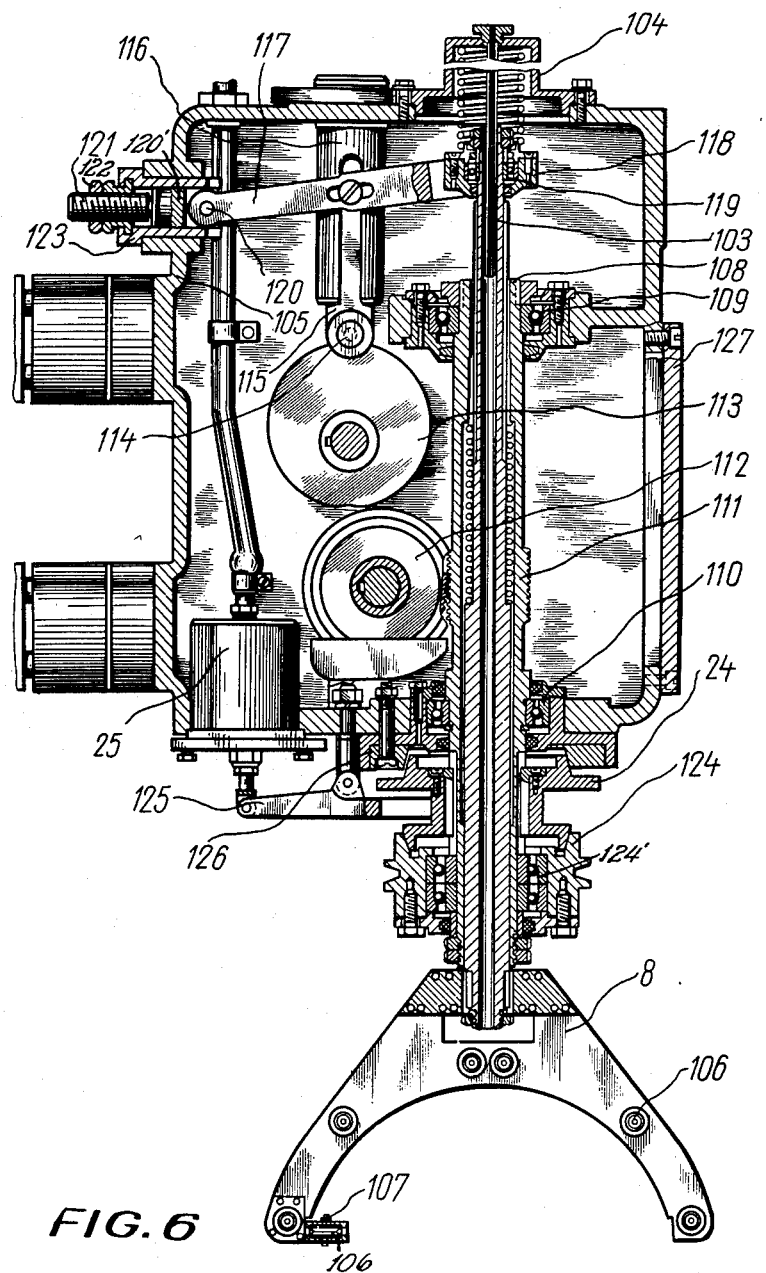
Figure 8:
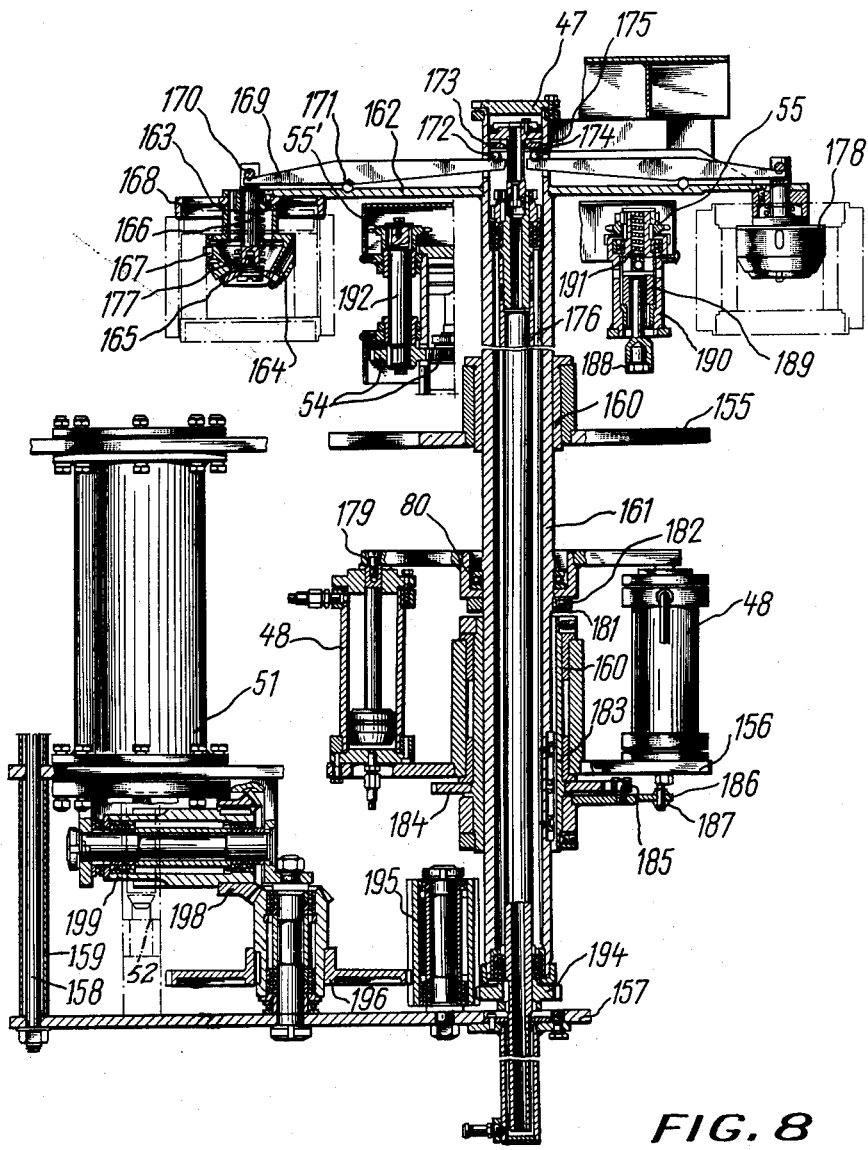
Figures 9A, 9B, 9C, 9D, 9E, 9F:
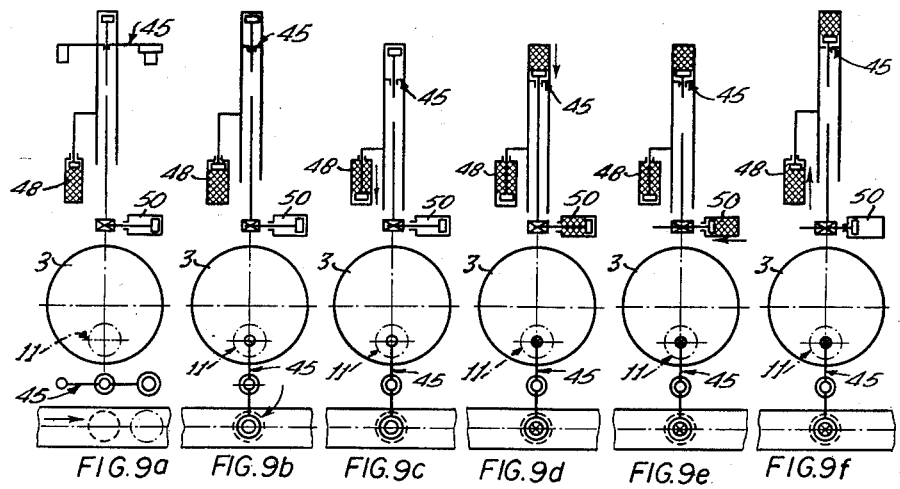
Figures 9G, 9H, 9I, 9J, 9K, 9L:
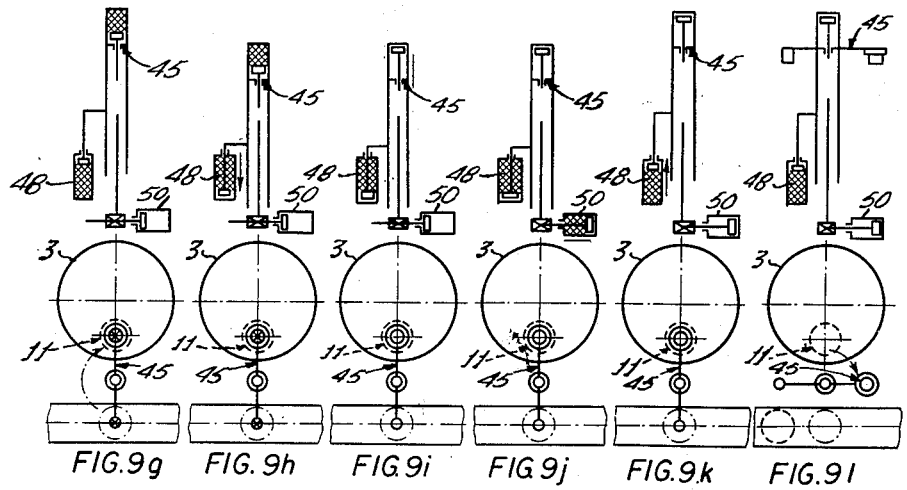
Figure 10:
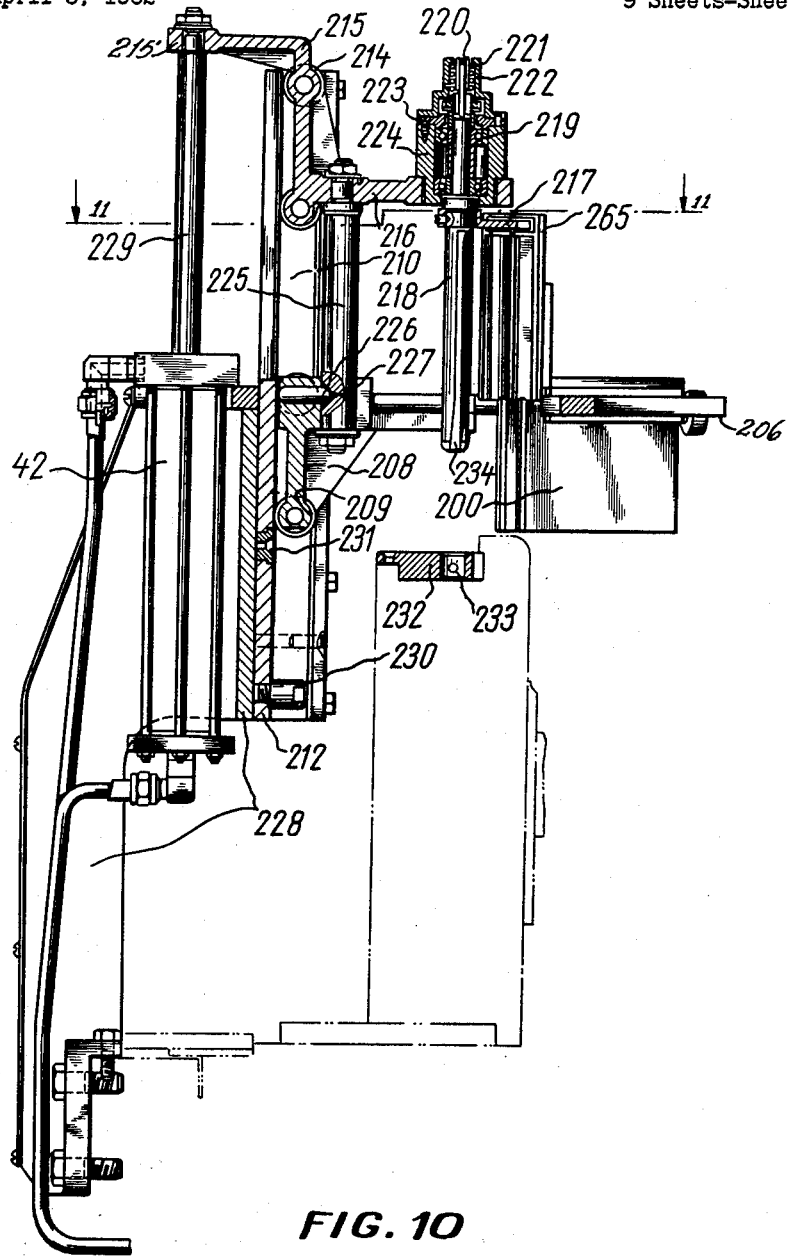

Further objects and advantages of the invention will be apparent from the following description taken in conjunction with the accompanying drawings wherein:

FIG. 1 is an elevational view of the proposed machine;
FIG. 2 an exploded view in perspective showing the relationship of the parts of the machine;
FIG. 3 is a longitudinal sectional view showing the turntable;
FIG. 4 a longitudinal sectional view showing the mandrel and coil former;
FIG. 5 a sectional view on the line 5—5 of FIG. 4;
FIG. 6 a longitudinal sectional view showing the winding device;
FIG. 7 a longitudinal sectional view showing the stator holder;
FIG. 8 an elevational view with parts in section showing the transfer device;
FIG. 9a a diagrammatic view showing the initial position of the transfer device when the winding is inserted into the grooves of the stator and the movement of the conveyor;
FIG. 9b a diagrammatic view showing stoppage of the machine and movement of the transfer device to a position ninety degrees from that shown in FIG. 9a;
FIG. 9c a diagrammatic view showing insertion of the clamps into the stator;
FIG. 9d a diagrammatic view showing release of the clamps;
FIG. 9e a diagrammatic view showing release of the stator from the stator holder;
FIG. 9f a diagrammatic view showing lifting of a stator from the conveyor and lifting of a wound stator from the stator holder;
FIG. 9g a diagrammatic view showing movement of the transfer device through one hundred eighty degrees to transfer a stator from the conveyor to the stator holder and of a wound stator from the stator holder to the conveyor;
FIG. 9h a diagrammatic view showing lowering of the stator into the stator holder and lowering of the wound stator onto the conveyor;
FIG. 9i a diagrammatic view showing release of the gripping means from the stator and wound stator;
FIG. 9j a diagrammatic view showing removal of the gripping means from the stator and wound stator;
FIG. 9k a diagrammatic view showing fastening of the stator in the holder;
FIG. 9l a diagrammatic view showing movement of the transfer device through ninety degrees and starting of the machine;
FIG. 10 an elevational view with parts in section showing the cover inserting device;

FIG. 11 a sectional view on the line 11—11 of FIG. 10; and

FIG. 12 a sectional view showing the cover feed magazine.

The machine of this invention is of the turret or turntable type and may be provided with four or six positions for performing the necessary separate operations simultaneously.

The machine performs the following basic operations:

(a) winding of the wire forming the coil into the coil former by the rotary coiler, (b) insertion of the wound coil within the working mandrel of the machine, (c) removal of the coil former from the coil, (d) insertion of the wound coil into the grooves of the stator and at the same time inserting cardboard covers in the grooves occupied by the conductors, (e) preliminary forming of the coil heads disposed in the stator by pressing from the center toward the periphery.

In the main, the following auxiliary operations are performed in the process of winding:

(1) turning of the stator through a given angle after insertion of each coil or a group of coils, (2) gripping of the upwound stator on the conveyor or other feeding mechanism, (3) transfer of the unwound stator to the machine and orienting the same, (4) securing of the unwound stator in the machine, (5) releasing of found stator and removal from the machine, (6) depositing the wound stator on the conveyor or other delivery device.

This machine is free from the drawbacks of the above mentioned prior art machines. The coils are found by simple rotative motions of the coiler and additional movement for properly locating the wire on the coil former. Movements of the working parts of the machine while inserting the coils into the grooves of the stator are also simple: the coils are inserted while the stator moves in-and-out at low speeds relative to the coil. Simple working movements of the machine, low speeds of the movements of its working parts, absence of any significant inertia contributes to simplicity of design, low cost manufacture, high efficiency, ease of attendance by an operator and reliability.

In the main, winging and insertion of the wound coils into the stator grooves by means of this machine does not differ from the same operations performed by manual insertion of coils. Therefore, the wire is not deformed more than by manual insertion of the coils by a qualified winder. The same is true for the deformation of the insulation.

The essential peculiarity of the proposed machine which should be noted is the possibility of winding the coil with different groove pitches. As it is known, in the most generally used electrical engines with stator windings (e.g. in the three-phase asynchronous engines) different types of the latter with coils of the same or different pitches are used. The most widely used two-layer winding where one part of the coil is laid on the bottom of the groove and the other one—in its upper zone, cannot be performed mechanically since practically it is impossible to place the conductors into the grooves under the coil already laid. Numerous experiments have shown that for mechanized laying one layer concentric winding which, however, consists of coils with various pitches is more convenient. For instance, the four-pole winding with 24 grooves consists of concentrically laid coils with pitches 1–6 and 1–8, and with their heads placed in two planes.

In any machine performing a direct winding of coil turns in the stator grooves readjusting of the machine for winding coils of various groove pitches requires considerable complication of the design and kinematics.

Presence of rhythmically alternating coils of various groove pitches in the winding does not require and material complication of the design of the proposed machine. The machine may be fitted with formers for coils with various pitches (one, two, three) and laying of concentrated windings on it causes no additional difficulties. The proposed machine is mounted on a cast bed frame 1 (FIG. I), the shape of the latter being almost cylindrical. Along the axis of the bed frame a circular vertical column 2 is fixed; on the lower part of the column a rotary table 3 is mounted on artifriction bearings; the table carries six working mandrels 4 and 5 and formers 6 and 7 for winding coils (if necessary, the machine may be designed with 4, 8 or other required number of working mandrels). The rotary table turns periodically by ⅙ of a revolution or by another appropriate angle depending upon the number of working mandrels on the machine. Here, the working mandrels move one after another between the working positions at which the following operations of the process are successively performed by the machine: coil winding, catching of the coils by the mandrels, removal of the winding formers from the coil, insertion of the coils into the grooves of the stator, as well as insertion of the groove covers into the grooves of the stator.

The mandrels and winding former have guide rollers which roll along the shaped grooves of the central drum cam fixed inside the bed frame of the machine. As a result when the table turns the moving parts of the mandrels, as well as the winding formers, move vertically through various distances depending upon the shape of the cam grooves. These movements are used for catching the coils by the mandrels and from removing the winding formers from the coils before inserting the latter into the grooves of the stator.

Depending upon the design of the winding, mandrels 4 and 5 may be identical or different for coils of various pitches. The body of the mandrel is immovable relative to the rotary table and the mandrel slider is movable in a vertical direction.

The coil is wound onto a fixed former by means of a rotating coiler 8 of the winding device 9 which apart from the rotary motion may also move vertically for spreading the turns of wire on the winding former in proper rows. The winding devices 8 is fixed on the central column 2 and is driven by a special electrical engine 10.

When the table 3 turns, that is, while the manarel slider and the former move downwardly, the coil wound onto the former is disposed in a gap in the mandrel and the former is withdrawn from the coil. The coil is then transferred to a position under the stator holder 11 in which the stator is fixed in the position required. When the table 3 stops the stator holder 11 together with the stator moves downwardly and the coil is introduced into the stator grooves. At this time the upper head of the coil leaves the mandrel and by reverse motion of the stator the coil is carried upward therewith. In the upper position of the stator the heads of the coil disposed in the stator groove are pressed outwardly by the leg 12 from the center of the stator toward the periphery for the purpose of preliminary forming and exposing the adjacent grooves for insertion of the next coils.

The stator holder 11 is mounted on the central column 2 of the machine. All movements of the holder and the leg 12 are effected by the aid of the pneumatic motors grouped in the assembly of the drive 13 which is mounted on the upper part of the column 2. Inside the column 2 a counterweight is provided for balancing the stator holder.

After inserting the coils in the grooves of the stator to be wound the grooves are covered with cardboard covers which are supplied from a magazine and are laid into the mandrel by the layer 14.

The machine is fed with the winding wire from a coil installed in the feeding device 15 fitted with a rotating winding off disk 20. The wire is directed by the stretcher 16 (which stops the machine in the case of rupture of the wire) to the winding device 9.

The transfer mechanism 18 serves for charging the holder 11 with the stators 17 to be wound and for removing the stators already wound. The transfer mechanism 18 is fastened to the bed frame of the machine and connects the automatic machine and the conveyor or other feeding mechanism delivering the stators to be wound and taking away the wound stators for subsequent operations.

The coiler 8 of the winding device 9 and the winding off disk 20 of the feeding device 15 are driven by special electrical engines. All other working and auxiliary movements of the working parts of the machine are performed by means of pneumatic motors supplied from a suitable source of compressed air.

The control panel 19 is connected with suitable electrical apparatus controlling the operation of the machine.

The coiler 8 of the winding device (FIG. 2) and the holder 11 for the stators are the basic operating members of the machine. The rotary table 3 with several (four, six, eight) working mandrels 4 and 5 for coils of various groove pitches provides a connecting link between the coiler 8 and the stator holder 11.

In the process of winding a coil the wire is wound off the coil by the disk 20 which rotates continuously when being driven by the electrical engine 21. The circular speed of the disk 20 is somewhat higher than the linear speed of the wire wound onto the former by the coiler 18.

The wire for the coil passes through the tension device 16 and over guide rolls 22 and enters the hollow spindle of the winding head and moves to the coiler 8; the latter, while rotating, winds the wire on the formers 6 and 7 forming a single-or multilayer coil.

The coiler 8 is driven by the electrical engine 10 by means of V-belt drive 23. When the machine is in operation the electrical engine 10 rotates continuously and the coiler (periodically) when the friction clutch 24 is engaged; the latter is controlled by the pneumatic motor 25. Winding of the wire in rows on the former results from vertical movements of the coiler provided by the cam 27 and a cam follower connected to the spindle of the winding device 8 by the lever 26. The cam 27 is driven by means of the worm drive 28 and the change speed gear wheels 29. The number of revolutions made by the coiler 8 per one revolution of the cam 27 is equal to the number of turns in each coil.

After a coil is wound onto the former the table 3 is moved to dispose the former and coil under the stator holder 11. The table 3 is moved by pneumatic motor 30 through the rack 31 and gear wheel 32; after the required movement, the table is fixed by means of slide-blocks 33 and a buffer device (not shown on the drawing) connected with the motor 34.

Upon rotary movement of the table the winding formers are removed from the coils by means of the central cam wheel 35, the shaped grooves of which receive the cam follower rolls of the formers 6 and 7 and mandrel sliders 4 and 5.

The coils are inserted into the grooves of the stator by moving the holder 11 down by means of the pneumatic motor 36. After inserting each coil or each group of coils the stator is turned by the pneumatic motor 37 by means of the rack 38 and the gear wheel 39. The holder 11 is fixed by the pneumatic motor 40; the mandrel slider is held up in inserting position by the pneumatic motor 41 as the present method of inserting the coils into the grooves requires the vertical movements of the mandrel sliders.

The covers for the grooves of the stator after inserting the coils into the grooves are disposed in the seats of the mandrels by means of the type automatic layer 14 driven by the pneumatic motor 42.

The heads of each inserted coil are moved toward the periphery of the stator by the leg 12 driven by the pneumatic motor 44.

Charging of the next new stator into the holder 11, removing of the stator already wound and fastening of the stator in the holder are performed by the transfer device 45. The stators to be wound and the wound stators are engaged by the grippers 46 driven by the pneumatic motor 47. Vertical movements of the transfer device are accomplished by twin pneumatic motors 48 and rotation of the transfer device is accomplished by the drive mechanism 49 provided with a pneumatic motor 50.

The stator is fastened in the holder 11 by a twin nut-setter driven by the pneumatic motor 51; movement of the piston rod of the pneumatic motor 51 is transferred to the nut-setter wrenches by means of the rack 52, gear wheels 53 and 54 and a chain drive with sprockets 55.

The program of the automatic control is provided by means of a controller provided with a pneumatic motor which turns the drum of the controller to the next position after insertion of each coil.

Thus, the mechanisms of the machine are operated by two electrical and sixteen pneumatic motors. The quantity of pure mechanical drives is rather small, they are of simple design and consist of a small number of links thus contributing to the relative simplicity of the machine as a whole.

The bed frame 1 of the machine is hollow (FIG. 3); it has three manholes 57 fitted with doors 58 which provide access to the mechanisms located inside the bed frame.

Inside the bed frame the central cam wheel 35 is fixed on the pad 59; the shaped grooves of the cam wheel provide for vertical movements of the mandrel sliders and winding formers when the table 3 turns.

In the central bore 60 of the cam wheel 35 a hollow cylindrical column 2 is rigidly fastened by means of conical seating surfaces and bolts 61.

The rotary table 3 is mounted on the lower part of the column 2 on conical roller bearings 62. The bearing clearance is adjusted by tightening their outside races by means of bolts 63. The weight of the table and parts carried thereby is supported on ball thrust bearing 65 which in turn is supported on self-adjusting spherical washers 66. At the coil inserting position below the stator holder 11 the table is 3 is additionally supported by the roller 67 freely rotating on the axle 68. In the rim of the table notches 33 are provided which serve to receive the spring index pin 69 mounted in the shoe 70 which is fastened to the bed frame. The number of notches 33 equals the number of mandrels mounted on the table. The notches 33 and the index pin 69 ensure the required position of the table, when the latter turns, and coincidence of axes of the stator and the mandrel which inserts the coil into the stator.

The table is rotated as required by means of the gear wheel 32 which by means of the gear wheel 71, spindle 72, skew-toothed clutch 73 and gear wheel 74 is connected with the rack 31 driven by the pneumatic motor 30 (see FIG. 2). The lower part of the spindle 72 and the rack 31 are supported by the bracket 75 fastened to the lower plate 76 mounted on the frame 1. The pneumatic motor 41 is mounted on the same plate 76. The piston rod 77 of the motor 41 engages against the runner 78 of the cam wheel 35. When inserting a coil into the grooves of the stator the runner 78 moves downwardly under the pressure of the stator or the slider of the mandrel. The runner is returned upwardly by the action of the pneumatic motor 41 aided by two springs 79.

The mandrel (FIGS. 4 and 5) has a casing 80 fastened by the flange 81 to the table 3. The casing 80 is tubular with a longitudinal groove into which the movable slider 82 of the mandrel enters.

In the interior of the mandrel casing 80 there is a sleeve 83 with two guide bushings 84 slidably engaging the matic motor 43. When the wound stator is to be re-inner surface of the casing. The sleeve 83 is fastened to the movable mandrel slider 82 connected with the shoe 85. The slider 82 together with the sleeve 83 and the shoe 85 may be moved relative to the casing 80 along its axis by means of the cam follower roller 86 which rolls along the upper shaped groove of the central cam wheel 35. The roller 86 is a conventional ball-bearing mounted on an axle pressed into the shoe 85.

The shoe is provided with a bushing 87 and the rod 88 of the winding former is slidably mounted therein. An axle with a second cam follower roller 89 is secured to the rod 88 and the roller 89 and is received in the lower groove of the cam wheel 35. When the table 3 turns the grooves of the cam wheel 35 cause the rollers 86 and 89 (and therefore the slider 82 and the rod 88 of the winding former) to move vertically relative to the table 3 and to each other a distance required for each position.

On the upper part of the rod 88 an adjustable winding former is mounted; the basic components of the latter are: the slide block 90, wedge 91 and pad 92 biased together by means of springs 93. The rods 94 fastened with pins 94' in the pad 92 serve as guides for the slide block 90.

The mandrel and the former are shown in FIG. 4 in the coil winding position. When the mandrel moves from the winding position to the next position by rotation of the table 3 the rollers 86 and 89 moves down simultaneously along the grooves of the cam 35. At this time the winding former and the slider 82 (without any movement relative to each other) move downwardly together so that the part of the coil disposed on the slider 82 moves into the gap 95 between the mandrel body 80 and the slider 82 until this portion of the coil is fully disposed in the gap 95.

In this position the slider 82 stops and the rod 88 of the former continues to move down. As a result the wedge 91 moves down relative to the pad 92 and the slide block 90 moves toward the pad 92 under the action of the springs 93 thus reducing the perimeter of the former. In this condition the winding former continues to move downwardly and withdraws from the coil, the coil at this time being suspended from the portion disposed in the gap 95 of the mandrel at an angle equal to the angle between the grooves of the stator into which the coil is to be inserted. In this position the coil is moved to the coil inserting station under the holder 11. At this time, the holder 11 moves downwardly and the portion of the coil projecting from the mandrel is inserted into the grooves of the stator.

After the coil enters the grooves the stator thrusts against the cleats 96 fastened to the mandrel slider 82 and the latter begins to move downwardly together with the stator. At this time the gap 95 of the mandrel gradually opens and the portion of the coil retained in the gap 95 is released, this operation being facilitated by the liner 97 engaging this portion of the coil and preventing any displacement of the coil relative to the immovable mandrel body 80. When the gap 95 of the mandrel is entirely open and the coil released the stator together with the inserted coil returns to the upper position.

Simultaneously with the insertion of the coils the stator grooves are covered with cardboard (or other) covers. For this operation seats 98 are provided between the cleats 96 into which the covers are introduced by the cover layer. When the mandrel gap 95 opens, the cleats 96 together with the slider 82, lower the covers against the projections 99 (which are fastened to the mandrel body) the stator moves over them and the covers are introduced into the stator grooves in which the coil had been previously inserted.

To prevent the wire insulation from being damaged by the groove edges when inserting the coil into the grooves of the stator protective jaws 100 made of thin spring steel are introduced between the conductors of the coil and the edges of the stator. The protective jaws 100 are fastened to the mandrel body 80 and to the slider 82 by means of the cleats 101 and suitable screws.

The upper end of the mandrel body 80 is closed by the cover 102.

The winding device (FIG. 6) is intended for winding coils onto the formers in one or several layers for the same or different perimeters.

From the tension device 16 the wire enters the hollow spindle 103 through the guide pipe fastened on the cap 104 mounted on the winding head body 105. The wire passes through the opening of the spindle 103 to the coiler 8 with guide rollers 106 mounted on ball-bearings on axles 107. The coiler 8 is rigidly fixed on the spindle 103 which may move axially inside the sleeve 108.

The sleeve 108 is mounted on two ball-bearings 109 and 110 and provided on the sleeve 108 is a worm 111 which meshes with the worm wheel 112 for driving the cam 113 through a suitable gear drive.

The number of revolutions of the coiler 8 corresponding to one revolution of the cam 113 is equal to the number of turns of the wound coil. When the cam 113 is heart shaped the coil is wound in two layers; in the case of a one-layer coil the form of the cam approaches the Archimedes spiral. When rotating, the cam 113 moves the cam follower roller 114 mounted on slide 115 which axially moves in the guide bushing 116; which is rigidly secured to the winding head body 105.

The slide 115 is connected with the lever 117 pivotally connected with the cage 118 in which the one-row ball-bearing 119 is fixed. The internal race of this ball-bearing 119 is rigidly fixed on the spindle 103. Thus, when the spindle 103 rotates the cam 113 through the follower roller 114, lever 117 and the ball-bearing 119 impart an axial movement to the spindle necessary for spreading the wire on the former.

The length of the axial movement of the spindle 103 depends upon the profile of the cam 113 but may be adjusted, to some extent, by changing the ratio of the arms of the lever 117. For this, the fulcrum 120 on which the lever 117 swings may move together with the block 120' in which it is mounted by means of the nut 122 threadedly received on the rod 121 connected to the block 120' and rotatably mounted in the bushing 123.

The winding device is driven by means of a V-belt drive. The driven pulley 124 of this drive is rotatably mounted on the sleeve 108 on ball-bearings 124'. When the machine is in operation the pulley 124 rotates continuously. To transmit rotation to the sleeve 108 the friction clutch 24 is engaged by means of the lever 125 connected with the piston rod of the pneumatic motor 25. Upon upward movement the clutch 24 is uncoupled from the pulley 124 and engages brake ring 126 fixed on the winding head body 105 which results in rapid stopping of the sleeve 108.

The body 105 of the winding device is closed by a cover 127. The assembled winding device is bolted on the central column 2 of the machine.

The stator holder 11 is intended to hold the stator while inserting coils into the stator grooves and to orient the grooves in the required position relative to the mandrels.

The stator 128 (FIG. 7) is installed in the required position on the bearing ring 129 screwed to the cage 130. The stator is held in position on the bearing ring by means of two holders 131.

The cage 130 is mounted in the body 132 of the holder 11 on upper and lower ball-bearings 133 for rotation about a vertical axis. Both rows of the balls 133 are retained in position by the races 134 screwed to the body 132.

The cage 130 may be rotated by means of the toothwheel rim 135 meshing with the driving gear 136. This gear 136 is rigidly connected with the skew-tooth driven clutch member 137. A driving clutch member 138 is slidably mounted on a multi-splined spindle 139 and is biased into engagement with the clutch member 137 by a compression spring 140. When desired the spindle 139 is driven by the pneumatic motor 37 and rotates the cage 130 and the stator to be wound through a given angle. When inserting the winding the stator rotates through different angles determined by the selected winding pattern but in one direction (clockwise, if seen from above). Therefore, with the reverse stroke of the piston rod of the pneumatic motor 37 the driving clutch member 138 compresses the spring 140 and slips over the bevelled parts of the teeth of the driven clutch member 137 and the gear wheel 136 does not rotate. After each partial rotation the cage 130 is retained in oriented position by a detent pin 141 entering one of the notches 142 in the index disk 143 fastened to the cage 130.

Adjacent the upper end 144 the spindle 139 is connected with the piston rod of the pnuematic motor 36 which provides for vertical movement of the stator holder 11. The stator holder 11 moves vertically along the guides 145 fastened on the central column 2 of the machine by means of the fitting 146 and the bolts 147.

As pointed out above, the coil carried by the mandrel is inserted into the grooves of the stator as a result of downward movement of the stator to the lower position in which the mandrel enters the interior of the stator. When the stator holder 11 moves downwardly the wire connecting the inserted coil with the next coil enters one of the six grooves of the loop-catcher 148. The tension of the connecting wire causes the pivotally mounted latch 149 to rise and as a result the wire moves behind the tooth 150 and is locked in the port 151 of the loop-catcher. After the next coil is inserted into the stator the connecting wire changes into a loop held up by the loop-catcher. This prevents entangling of the connecting loops when inserting the following coils. When the stator winding is completed the turn-ring 152 is turned through a certain angle by means of the handle 153 to open the grooves 154 and the loops of the wire are released and moved out of the grooves 154 when the wound stator is removed from the stator holder 11.

The transfer device (FIG. 8) is utilized for installing the stator to be wound on the machine in the position required, for fastening the stator in the holder 11 as well as for releasing and removing the wound stator from the machine. The main elements of the transfer device body are the three plates 155, 156 and 157 interconnected by the couplings 158 with the spacing tubes 159 which are fastened to the bed frame 1. Plates 155 and 156 are provided with bearing bushings 160 which receive and mount the column 161 of the transfer device.

The cross arm 162 mounted on the upper part of the column 161 is provided with two clamps—the left one—for the stator to be wound and the right one—for the wound stator. The design of both clamps are similar. Mounted on the mandrel 163 are three jaws 164 spaced 120° and connected by a spherical washer 165. The washer 165 is rotatably connected to the plunger 166 by a suitable screw.

The outer diameter of the mandrel 163 conforms to the inner diameter of the stator. The key 167 projecting from the mandrel 163 enters one of the grooves of the stator and serves to accurately locate the stator.

The plunger 166 is provided with a groove into which the end of the rocker arm 169 enters. This end of the rocker arm 169 engages a pin 170 extending across the groove in the plunger 166 while an intermediate point on the arm 169 is supported by the ball 171 which provides a fulcrum. The opposite end of the arm 169 engages the plunger 175 of the pneumatic motor 47 through the ball 172, washer 173 and spherical washer 174. Compressed air from the hollow shaft 176 enters the pneumatic motor 47 through the channel in the plunger 175.

Compressed air fed into the hollow shaft 176 causes the plunger 175 and the end of the rocker arm 169 engaging the plunger 175 to move downwardly. The end of the rocker arm 169 engaging the pin 170 rises and moves the plunger 166 and the jaws 164 which clamp the stator to be wound. When the hollow shaft 176 is connected with the atmosphere the spring 177 moves the plunger 166 downwardly, the jaws 164 retract and the stator is released. The clamp 178 for the wound stator is of a similar design but the clamping disk 168 and the key 167 are absent.

To introduce the clamps into the stator and to remove them from the latter the column 161 together with the cross arm 162 may be moved upwardly and downwardly by means of two coupled double acting pneumatic motors 48 connected to the column 161 through the cross head 179.

The column 161 is connected to the cross head 179 through a ball thrust bearing 180 which may be adjusted by the nut 181 having a set screw 182. In addition to vertical movement the column 161 may rotate about its axis. For this purpose the column 161 is keyed to the bushing 183 and may move in it along the axis only. The bushing 183 is provided with a toothed disc 184 engaged by the pawl 185 connected by means of the crank 186 with the piston rod 187 of the pneumatic motor 50 as shown in FIG. 2. When the piston rod 187 moves along its axis the crank 186 pivots on the bushing 183 on the neck of which the crank 186 is freely fitted and pawl 185 turns the disk 184 together with the bushing 183 and the column 161.

A double pneumatic nut-setter is also provided on the transfer device. The nut 131' for the clamp 131 of the stator holder 11 is engaged by the wrench 188 carried by the hollow spindle 189 mounted in a ball-bearing and a bushing in the socket 190 which is welded to the cross arm 162. The wrench 188 may swing transversely a limited distance and may also move axially in the spindle 189 while compressing the spring 191.

The sprocket 55 fitted on the spindle 189 is connected by a roller chain with another similar sprocket 55' fixed on the intermediate spindle 192 connected by the gear wheels 54 with the spindle 176 of the transfer device. The spindle 176 is driven through the gear wheels 194, 195, 196, 198 and 199 by the rack bar 52 connected with the piston rod of the pneumatic motor 51.

Depending upon the direction of the piston movement of the pneumatic motor 51 the wrenches 188 of the nut-setter rotate in a right or left hand direction and release or tighten the clamp nut 131' of the stator holder 11 for securing the stator in place on the machine.

The sequence of operations performed by the transfer device and associated mechanisms are shown diagrammatically in FIGS. 9a to 9i and diagrammatically illustrated in these figures are the turntable 3, the stator holder 11, the transfer device 45, the pneumatic motor 48 for raising and lowering the transfer device, the pneumatic motor 50 for rotating the transfer device and a conveyor for bringing stators to be wound to the apparatus and for receiving and conveying wound stators from the apparatus.

As shown in FIG. 9a, the transfer device 45 is at rest and during this period windings are inserted in the grooves of the stator located in the stator holder 11. After completion of the winding inserting operation, the transfer device 45 moves to the position shown in FIG. 9b and thereafter moves downwardly as to the position shown in FIGS. 9c to 9e during which time, the stator gripping means on the transfer device 45 engages and grips a stator on the conveyor, engages and grips the wound stator in the stator holder 11, releases the stator clamp on the stator holder 11 and thereafter, as shown in FIG. 9f, the transfer device 45 moves upwardly to lift the wound stator from the stator holder 11 and to lift a stator to be wound from the conveyor.

At this time, as shown in FIG. 9g, the transfer device 45 rotates one hundred eighty degrees to position the wound stator above the conveyor and to position the stator to be wound over the stator holder 11. As shown in FIG. 9h the transfer device 45 moves downwardly to position the wound stator on the conveyor and to insert the stator to be wound in the stator holder 11. At the same time, as shown in FIGS. 9i to 9k, the stator gripping means on the transfer device is released from the stator to be wound positioned in the stator holder 11 and is released from the wound stator deposited on the conveyor and simultaneously therewith the stator clamping means on the stator holder 11 is actuated to clamp the stator to be wound therein. Thereafter, as shown in FIG. 9l the transfer device 45 rotates through ninety degrees to position the same in the location of FIG. 9a, at which time winding of the coils and insertion of the same into the stator positioned in the stator holder 11 takes place.

The grooves of the stator into which the coil is inserted are closed simultaneously with insertion of the coil with cardboard (or other) suitable covers. To this end a special cover feeder is provided as shown in FIGS. 10, 11 and 12.

The cover feeder deposits a cover in the seat 98 of the mandrel preceding the winding station, the cover being supplied from the magazine 200. For each coil of a certain groove pitch two magazines are required. FIGS. 10, 11 and 12 show a cover feeder with four magazines for a machine intended for inserting coils with two different groove pitches.

The magazines 200 are in the form of a box with a detachable rear closure 201 to which a follower spring 202 is fastened. The spring 200 urges the stack of covers 203 toward the feeding position. The closure 201 is locked in position by the spring latch 204. The leading cover 203 in the magazine 200 may be ejected from the magazine in a downward direction by means of the push rod 205 sliding along the guide groove on the end wall of the magazine 200.

The magazines 200 are mounted on a movable platform 206 fastened in the adjustable cleats 207 of the lower carriage 208. The magazines 200 are placed on the platform 206 at angles corresponding to the angles between the grooves of the stator into which the coils are to be inserted.

The lower carriage 208 is provided with four guide rollers 209 freely rotating on their axles. The rollers 209 may roll along two guide grooves 210 and 211 formed by the plate 212 and the cleats 213 fastened to the latter.

Four similar rollers 214 are provided on the upper carriage 215 which is a part of the mechanism for moving the push rods 205 which travel in the guide grooves 210 and 211 and the upper carriage 215 is provided with an arm 216. This mechanism also has a sector 217 engaging in the grooves 205' in the upper ends of push rods 205. The sector 217 is fastened on the bar 218 mounted on the ball-bearings 219. In the upper end of the bar 218 there is a groove 220 which receives one end of the coil spring 221. The other end of the spring 221 is received in a groove in the cap 222 and the latter together with the cover 223 is fastened to the body 224 mounted on the arm 216. Under the action of the spring 221 the bar 218 with the sector 217 tends to turn counter-clockwise into the position in which projections thereon engage in the grooves 205' of the push rods 205 of the inner pair of magazines 200.

The upper carriage 215 is connected with the lower carriage 208 by a pin 225 which is fixed in the upper carriage and may slide in an aperture in the lower carriage 208. A detent pin 226 may engage in a seat 227 in the pin 225 as shown in FIG. 10 to lock the pin 225 in one position.

The cover feeder is driven by the double acting motor 42 mounted on the bracket 228 bolted to the bed frame 1 of the machine. The piston rod 229 of this pneumatic motor 22 is fastened to the tongue 215' of the upper carriage 215. When compressed air is delivered to the upper end of the pneumatic motor 22 the carriages 208 and 215 together with the platform 206 move downwardly and the magazines 200 are moved to a position adjacent to the cover receiving seats of the appropriate mandrel.

When the lower carriage 208 reaches the stop member 230 the detent pin 226 is disposed opposite the seat 231.

The detent 226 moves into the seat 231 and disengages from the seat 227 to release the pin 225. The upper carriage 215 and pin 225 continue to move downwardly and through the bar 218 and the sector 217 moves the push rods 205 downwardly to eject the leading covers 203 from the magazines 200 and depositing the covers 203 in the receiving seats of the mandrels.

When the movable part of the cover feeder moves downwardly the bar 218 enters the hole of the cover 232 of the mandrel. In the mandrels used for grooves of lesser pitch the bar 218 passes freely through the cover 232 and the sector 217 actuates the inside pair of push rods 205 as shown in FIG. 11. The covers 232 of the mandrels used for grooves of greater pitch are provided with a pin 233 which engages in the skewed end in the groove 234 of the bar 218. Since the end of the groove 234 is skewed, upon downward movement of the bar 218 the pin 233 forces the bar 218 to turn through a certain angle. This causes the sector 217 to turn, and disposes the recesses 235 opposite the push rods 205 of the inner pair of magazines 200 and to dispose the projections on the sector 217 opposite the push rods 205 of the outer pair of magazines. Upon subsequent downward movement the sector 217 moves the push rods 205 of the outer pair of magazines downwardly and ejects the covers out of the latter while the push rods of the inner pair of magazines remain at rest. Thus a selective action of the cover feeder is obtained and the latter ejects the cover blanks from the magazines in accordance with the requirements of the stator being wound.

It will be obvious to those skilled in the art that various changes may be made in the invention without departing from the spirit and scope thereof and therefore the invention is not limited by that which is shown in the drawings and described in the specification, but only as indicated in the appended claims.

We claim:

1. An apparatus for winding coils and inserting said coils into the grooves of a stator for a dynamo-electric machine, said apparatus comprising a base, a turntable rotatably mounted on said base, means to rotate said turntable step-by-step, a plurality of mandrels mounted on said turntable and projecting upwardly therefrom, a slider on each mandrel movable from a position projecting above the upper end of the mandrel to a position below the upper end of the mandrel, a gap between said slider and the mandrel, a winding form mounted for vertical movement on said turntable adjacent each mandrel, cam means for moving said sliders and said coil forms vertically with respect to said mandrels and with respect to each other upon rotation of said turntable, a coil winding device disposed at a coil winding station, means for feeding wire to said winding device, means for rotatably driving said winding device and means to reciprocate said winding device to wind a coil on said form and the upwardly projecting portion of said slider, subsequent movement of said slider and form downwardly serving to deposit a portion of said coil in said gap and withdraw said form from said coil, a stator holder disposed at a coil inserting station and movable from a position above a mandrel downwardly over the mandrel and return, means to clamp a stator in said holder, means to index said holder to orient the grooves in the stator for the insertion of coils therein, whereby upon downward and upward movement of said holder a coil carried by a mandrel is inserted into the appropriate grooves of the stator and removed from the mandrel, means for pressing the heads of the inserted coil outwardly toward the perimeter of the stator and a transfer device for positioning a stator to be wound in said holder and for removing a wound stator therefrom.

2. An apparatus as defined in claim 1, in which stator groove cover receiving seats are provided in said mandrels and cover feeding means for depositing covers in said seats prior to the winding of a coil.

3. An apparatus as defined in claim 2, in which said cover feeding means includes magazines for receiving stacks of covers, vertically movable pushers for ejecting covers from said magazines and a pneumatic motor for actuating said pushers.

4. An apparatus as defined in claim 3, in which a plurality of pairs of magazines and pushers are provided and means to actuate said pushers to selectively eject covers from different pairs of magazines.

5. An apparatus as defined in claim 1, in which said winding form is extensible and contractable and means operable upon upward and downward movement of said form to expand and contract the same.

6. An apparatus as defined in claim 1, in which said transfer device comprises a column rotatably and slidably mounted on said base, a cross arm fixed to said column adjacent the upper end, a stator gripping means on each end of said cross arm, a pneumatic motor in the upper end of said column, a pair of rocker arms pivotally mounted on said cross arm, one end of each rocker arm being operatively connected to one stator gripping means, the opposite end of each rocker arm being operatively connected to said motor, whereby upon operation of said motor said gripping means are actuated to grip or release stators, a cross head fixed to said column, a pair of pneumatic motors mounted on said base and operatively connected to said cross head to raise and lower said column and said stator gripping means, means for rotating said column to move one of said gripping means from a position over a conveyor to a position over said stator holder and the other gripping means from a position over said stator holder to a position over the conveyor and means on said transfer device for actuating the clamping means on said stator holder.

7. An apparatus as defined in claim 6, in which the means for rotating said column comprises a toothed wheel fixed to said column, a pawl engaging said wheel and a pneumatic motor for actuating said pawl.

8. An apparatus as defined in claim 6, in which each of said stator gripping means comprises a stator mandrel of a diameter to be received within said stator, a plurality of stator gripping jaws slidably mounted in said stator mandrel, a plunger slidably mounted in said stator mandrel, one end of said plunger being connected to said jaws and the opposite end of said plunger being connected to one of said rocker arms and spring means for urging said plunger in a direction to retract said jaws, operation of said rocker arms serving to actuate said plungers to move said jaws into engagement with said stators to grip the same.

9. An apparatus as defined in claim 8, in which an index pin is provided on said gripping means, said pin serving to engage in a groove of the stator to orient the same with respect to the gripping means.

10. An apparatus as defined in claim 9, in which a stator engaging ring is provided on said gripping means adjacent the upper end of said stator mandrel, said ring serving to engage said stator and limit insertion of said stator mandrel to position said stator axially on said stator mandrel.

11. An apparatus as defined in claim 6, in which said stator clamping means includes a clamping nut and in which said clamp actuating means comprises a pair of socket wrenches mounted on said column, one of said wrenches engaging said nut in each operative position of said transfer device, a spindle connected to each wrench, a sprocket on each spindle, a drive shaft rotatably mounted within said column, a pneumatic motor for driving said drive shaft in forward and reverse directions, a countershaft, inter-meshing gears on said drive shaft and countershaft, a sprocket on said countershaft and a chain engaging the sprockets on said spindles and the sprocket on said countershaft, whereby upon rotation of said drive shaft in one direction said wrenches will operate to tighten said nut and upon rotation of said drive shaft in the opposite direction said wrenches will operate to release said nut.

12. An apparatus as defined in claim 11, in which said wrenches are mounted in said spindles for limiting transverse swinging movement to compensate for slight misalignment between said wrenches and said nut.

13. An apparatus as defined in claim 12 in which said wrenches are slidably mounted in said spindles and spring means for resisting inward and axial movement of said wrenches.

References Cited by the Examiner
UNITED STATES PATENTS

| | | | |
|---|---|---|---|
| 2,712,836 | 7/55 | Marzolf | 140—92.1 |
| 2,782,809 | 2/57 | Smallridge | 140—92.1 |
| 2,836,204 | 5/58 | Mason | 140—92.1 |
| 2,934,099 | 4/60 | Mason | 140—92.1 |
| 3,036,603 | 5/62 | Moore | 140—92.1 |

CHARLES W. LANHAM, *Primary Examiner.*

WILLIAM J. STEPHENSON, *Examiner.*